United States Patent [19]

Keck

[11] Patent Number: 4,793,673

[45] Date of Patent: Dec. 27, 1988

[54] TRANSMISSION DEVICE FOR CONTROL PANELS IN COMMUNICATIONS TERMINAL EQUIPMENT

[75] Inventor: Erich Keck, Fuerstenfeldbruck, Fed. Rep. of Germany

[73] Assignee: Siemens Aktiengesellschaft, Berlin and Munich, Fed. Rep. of Germany

[21] Appl. No.: 866,918

[22] Filed: May 27, 1986

[30] Foreign Application Priority Data

Jun. 13, 1985 [DE] Fed. Rep. of Germany ....... 3521277

[51] Int. Cl.$^4$ .................................. G02B 6/00

[52] U.S. Cl. .................................. 350/96.10; 200/296; 200/314; 200/315

[58] Field of Search ............... 350/96.10, 96.20, 96.24; 200/295, 296, 313, 314, 315, 316

[56] References Cited

U.S. PATENT DOCUMENTS

| | | | |
|---|---|---|---|
| Re. 30,435 | 11/1980 | Fukao | 200/295 X |
| 3,308,260 | 3/1967 | Krieger et al. | 200/168 |
| 3,501,975 | 3/1970 | Groemminger, Jr. | 74/501 |
| 4,055,738 | 10/1977 | Beck | 200/296 |
| 4,301,344 | 11/1981 | Sakakino et al. | 200/314 |
| 4,315,123 | 2/1982 | Fujita et al. | 200/316 X |
| 4,638,131 | 1/1987 | Kidd et al. | 200/61.55 |

FOREIGN PATENT DOCUMENTS

| | | | |
|---|---|---|---|
| 944521 | 4/1949 | France . | |
| 1387813 | 4/1971 | United Kingdom | 200/296 |
| 1391348 | 6/1972 | United Kingdom | 200/296 |

*Primary Examiner*—John D. Lee
*Assistant Examiner*—Phan Heartney
*Attorney, Agent, or Firm*—Hill, Van Santen, Steadman & Simpson

[57] ABSTRACT

A transmission device of injection molded plastic is provided in order to be able to connect function elements (keys, light-emitting diodes) secured on printed circuit boards to remote control panels in communications terminal equipment. It contains thrust elements composed of a one-piece plastic part which assumes both the articulation function as well as the spring effect of the restoring function. An arbitrary plurality of these thrust elements is accepted by plastic guides which can either be fashioned as a solid block or can be composed of an arbitrary number of sub-elements. Entire control panels whose electrical components lie at the central assembly can be produced at an arbitrary location in this way by combination with light conductors.

12 Claims, 1 Drawing Sheet

TRANSMISSION DEVICE FOR CONTROL PANELS IN COMMUNICATIONS TERMINAL EQUIPMENT

BACKGROUND OF THE INVENTION

1. Field of the Invention

The invention relates to a transmission device for control panels in communications terminal equipment wherein function elements allocated to the control panels are rigidly arranged at a distance from the control panels, being secured on printed circuit boards.

2. Description of the Prior Art

Whether they are input elements such as keys or display elements such as light-emitting diodes, the operating elements required in communications terminal equipment are frequently used at locations of the apparatus which are favorable in ergonomic and design terms but which lie at a considerable distance from the actual, central assembly.

In this case, it was hitherto standard to arrange the operating elements, whether keys or light-emitting diodes, on their own printed circuit board and to mechanically secure this behind the housing wall fashioned as a control panel. This separate printed circuit board was then connected to the central control by means of lines and plugs. In addition to the high costs required, such a solution has the disadvantage that a high noise voltage emission ensues via the lines, a low electromagnetic compatibility resulting therefrom overall.

SUMMARY OF THE INVENTION

An object of the invention is to design a transmission device for control panels in communications terminal equipment of the type described above in a simple and cost-favorable way such that a high electro-magnetic compatibility with the lowest possible noise voltage emission ensues overall.

Given a transmission device of the type described, this object is achieved by using stationary guide elements which are formed both for the acceptance of mechanical thrust elements arranged between the function elements and the control panels and displaceable against a spring force as well as for the acceptance of light conductors.

As a result of the provision of such stationary guide elements, the key stroke can be transmitted via arbitrary angles and paths onto the key elements directly soldered into the central printed circuit board. As a result of combination with light conductors which can be likewise arranged in the guide elements, entire control panels can be produced at an arbitrary location in this way, the light-generating electrical components of these control panels lying at the central assembly.

In an advantageous embodiment of the invention, all elements of the transmission device are composed of injected plastic parts. The thrust element is thereby likewise fashioned as a plastic part and assumes both the articulation function as well as the restoring function due to the spring effect. An arbitrary plurality of these thrust elements is accepted by the guide elements which can either be fashioned as a whole block or can be layered to form batteries composed of an arbitrary number of parts. A transmission device which is manufacturable in a cost-beneficial way and has high electro-magnetic compatibility and low noise voltage emission thereby derives.

BRIEF DESCRIPTION OF THE DRAWINGS

Embodiments of the invention are shown in the drawings and shall be set forth in greater detail below by way of example. Shown therein are.

DESCRIPTION OF THE PREFERRED EMBODIMENTS

Figure 1:
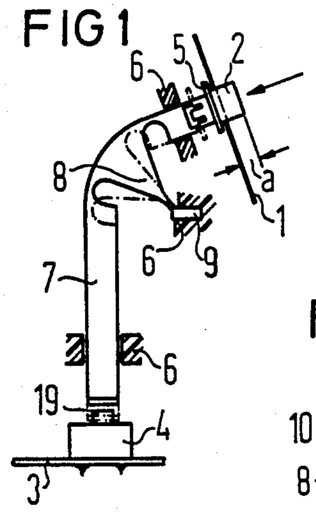
FIG. 1 is a schematic sectional view of an individual thrust element of the transmission device.

A communication device, for example, a teleprinter, which is not shown in detail here, comprises control panels, namely, in the form of key heads 2 at a housing part 1. Keys 4 situated on printed circuit boards 3 and located at a distance in the housing from the key heads 2 are to be actuated via these key heads 2, namely, the key stroke "a" of the key head 2 provided with a stop collar 5 should be completely transmitted onto the key 4. For this purpose, thrust elements 7 likewise fashioned of plastic are arranged in stationary guide elements 6 which are composed of an injected plastic part. The thrust elements which are angled in this case, are latched in the stationary guide element via an elastic projection 8 having an appertaining fastening web 9. The projection member 8 thereby assumes both the articulation function of the thrust element 7 as well as the restoring function due to its spring effect. After actuation of the key head 2 in arrow direction, the key 4 is actuated via the thrust element 7 in an impact-elastic fashion. For the purpose of being restored into the initial position, the restoring force emanating from the projection member 8 in combination with the fastening member 9 takes effect and presses the key head 2 into its initial position in which the collar member 5 lies against the housing 1.

Figure 2:
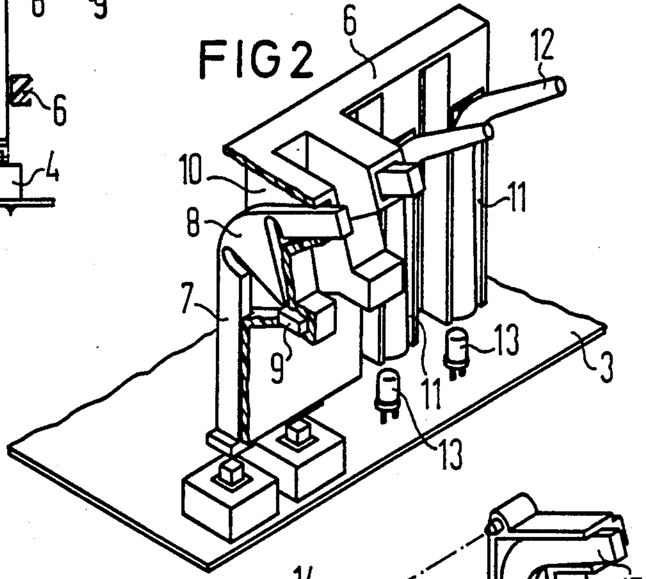
FIG. 2 is a schematic illustration of the transmission device wherein the stationary guide element is fashioned of one piece.
Figure 3:
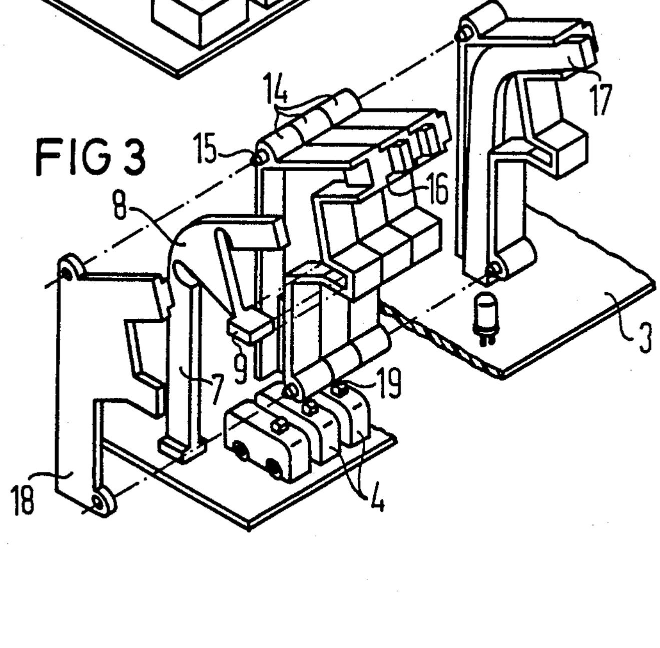
FIG. 3 is a schematic illustration of the transmission device wherein the stationary guide element is fashioned joinable in block-fashion.

Various embodiments of the stationary guide element and, thus, of the overall transmission device are shown in FIGS. 2 and 3 to be set forth below. In the exemplary embodiments of FIG. 2, the stationary guide element 6 manufactured of a plastic injection molding is composed of a block fashioned in one piece which, first, comprises recesses 10 for the acceptance of the thrust elements 7, but, second, also comprises guide recesses 11 for the acceptance of light conductors 12 composed, for example, of optical fibers. With these light conductors, it is possible to transmit the light emanating from light-emitting diodes 13 arranged on the printed circuit board 3 into the control panel region of the housing 1.

In the exemplary embodiment shown in FIG. 3, the stationary guide element is fashioned joinable in blocks, namely, of individual sub-elements 14 fashioned half-shell like. Each sub-element comprises connecting projections 15 and guide projections 16 which enable the individual sub-elements to be layered on top of one another so that the bottom of the one sub-element forms the cover for the neighboring sub-element. Seated in the sub-elements are, first, the thrust elements 7 but, second, light conductors 17 can also be arranged in the same sub-elements, these light conductors 17, differing from the embodiment 12 of FIG. 2, then being fashioned in accord with the outside dimentions of the thrust elements 7. Such a block composed of individual sub-elements 14 and, thus, the overall stationary guide element is covered by a front cover 18. When keys comprising luminous elements in the region of an actuation head 19 are employed in the exemplary embodiment of FIG. 3 instead, for example, of the standard keys 4, then, given an appropriate modification of the projection member 8 of the thrust element 7, it is also possible to fashion the thrust element 7 itself as a light conductor in order to thus enable a displaying actuation of the keys 4.

The overall stationary guide element is latched or, respectively screwed in the housing in a way which is not shown here.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A transmission device for control panels in communications terminal equipment having function elements wherein the function elements allocated to the control panels are rigidly arranged at a distance from the control panels, the function elements being secured on printed circuit boards, comprising the improvement of stationary guide elements which are fashioned both for the acceptance of mechanical thrust elements arranged between the function elements and the control panels and displaceable against a spring force as well as for the acceptance of light conductors.

2. A transmission device according to claim 1, wherein the stationary guide elements are formed as blocks of sub-elements.

3. A transmission device according to claim 1, wherein each thrust element is fashioned of one piece and is seated in the guide element pivotable around a resilient projection.

4. A transmission device according to claim 1, wherein the elements of the transmission device are composed of plastic injection parts.

5. A transmission device according to claim 1, wherein each thrust element also comprises a light conductor.

6. A transmission device for control panels in communications terminal equipment having function elements wherein the function elements allocated to the control panels are rigidly arranged at a distance from the control panels, the function elements being secured on printed circuit boards, comprising the improvement of stationary guide elements which are fashioned both for the acceptance of mechanical thrust elements arranged between the function elements and the control panels and displaceable against a spring force as well as for the acceptance of light conductors, the stationary guide elements being formed as blocks of sub-elements and wherein the individual sub-elements are fashioned half-shell-like and comprise latch guides which enable the individual sub-elements to be layered on top of one another, so that the bottom of the half shell of the one sub-element accepting the thrust element or the like conductor terminates the sub-element arranged next to it.

7. In a transmission device for control panels in communications terminal equipment wherein function elements operated from the control panels are rigidly secured on printed circuit boards at a distance from the control panels, the improvement comprising:

stationary guide elements positioned between said control panels and function elements;

mechanical thrust elements carried in said stationary guide elements to extend between said control panels and said function elements;

biasing means operative on said thrust elements to continuously urge said thrust elements away from said function elements;

light conductors carried in said stationary guide elements to extend between said control panels and said function elements;

whereby manual force applied to individual thrust elements at said control panels is transmitted to selected function elements allocated to said individual thrust elements.

8. A transmission device according to claim 7, wherein said stationary guide elements are formed in blocks of sub-elements.

9. A transmission device according to claim 7, wherein said thrust elements and biasing means are constructed as a single piece, the biasing means being a resilient projection seatable in said guide elements around which said thrust elements are pivotable.

10. A transmission device according to claim 7, wherein the elements of the transmission device are fabricated of plastic injection parts.

11. A transmission device according to claim 7, wherein at least some of said light conductors are carried within said thrust elements.

12. A transmission device for control panels in communications terminal equipment wherein function elements operated from the control panels are rigidly secured on printed circuit boards at a distance from the control panels, the improvement comprising:

stationary guide elements positioned between said control panels and function elements;

said stationary guide elements being formed in blocks of sub-elements, wherein the individual sub-elements are formed as half shells and contain latch guides which enable the individual sub-elements to be stacked on top of one another, so that a bottom of a half shell of one sub-element terminates the sub-element arranged next to it;

mechanical thrust elements carried in the said stationary guide elements to extend between said control panels and said function elements;

biasing means operative on said thrust elements to continuously urge said thrust elements away from said function elements;

light conductors carried in said stationary guide elements to extend between said control panels and said function elements;

whereby manual force applied to individual thrust elements at said control panels is transmitted to selected function elements allocated to said individual thrust elements.

* * * * *